Dec. 4, 1962    T. W. SMITH ET AL    3,066,892
AIR INTAKES FOR AIR-CONSUMING PROPULSION ENGINES
OF SUPERSONIC AIRCRAFT
Filed Feb. 23, 1960    4 Sheets-Sheet 1

Inventors:
Thomas William Smith
John Weir
By: Stevens, Davis, Miller & Mosher
Attorneys United States Patent Office 3,066,892
Patented Dec. 4, 1962

3,066,892
AIR INTAKES FOR AIR-CONSUMING PROPULSION ENGINES OF SUPERSONIC AIRCRAFT
Thomas William Smith and John Weir, Preston, England, assignors to The English Electric Company Limited, London, England, a British company
Filed Feb. 23, 1960, Ser. No. 10,190
Claims priority, application Great Britain Mar. 12, 1959
9 Claims. (Cl. 244—53)

The present invention relates to an air intake for the air-consuming propulsion engine or engines of a supersonic aircraft. In order to attain maximum propulsive efficiency over the speed range a variable geometry of the air intake is required to ensure that the intake is properly matched to the engine mass flow.

According to the present invention, two tapered ramp bodies of curved cross section are mounted co-axially at the intake with their bases facing one another, one pointing forward upstream of the lip of an intake cowl, the other pointing back into said cowl. Both bodies may have straight or curved generatrices and are hinged transversely of their longitudinal axes about a point at or near their apices and can be raised and lowered about their hinge axes, by means of a suitable mechanism. When such an intake is mounted on a fuselage or wing, the flanks of the said bodies, near the junction of the bodies with the wing or fuselage, can be made straight, which avoids awkward gaps at this junction and makes for smooth operation. A gap in the region of the two adjoining bases of the part-cones can be used for bleeding-off the boundary layer there.

When arranging such an intake on the side of an aircraft fuselage forward of the leading edge of an aircraft wing, a half-cone may be used for the forward body, an arrangement which is preferred. If the intake is in a wing-fuselage junction, quarter-cones would have to be used which are considered less favourable.

Figure 1:
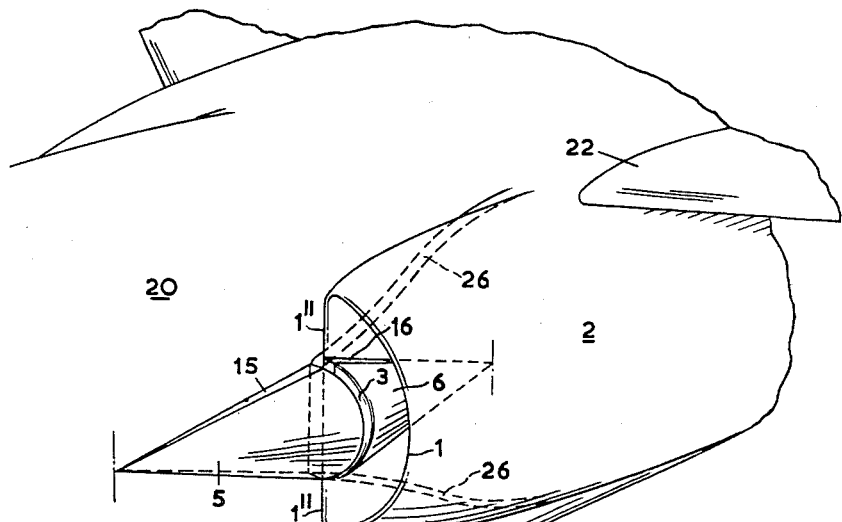
Figure 2:
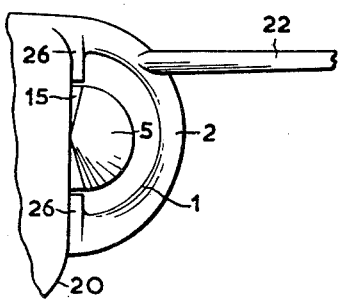
Figure 3:
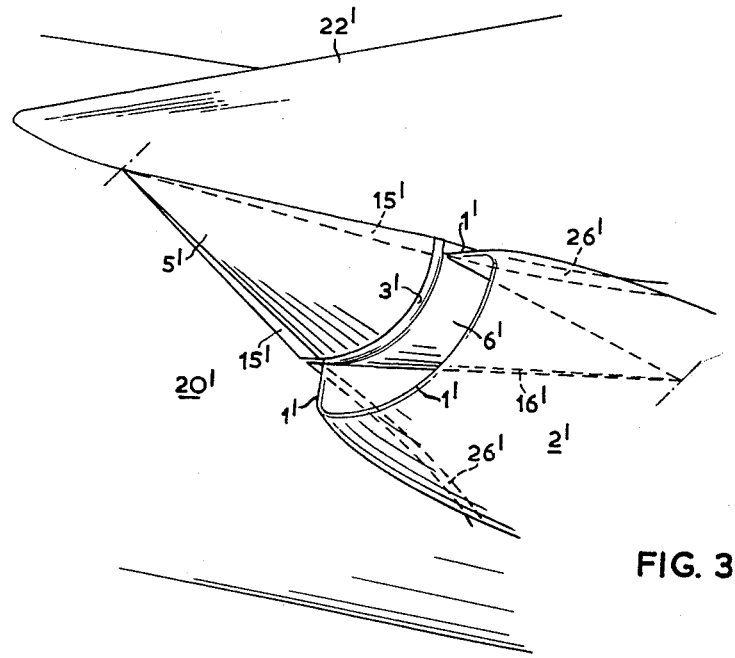
Figure 4:
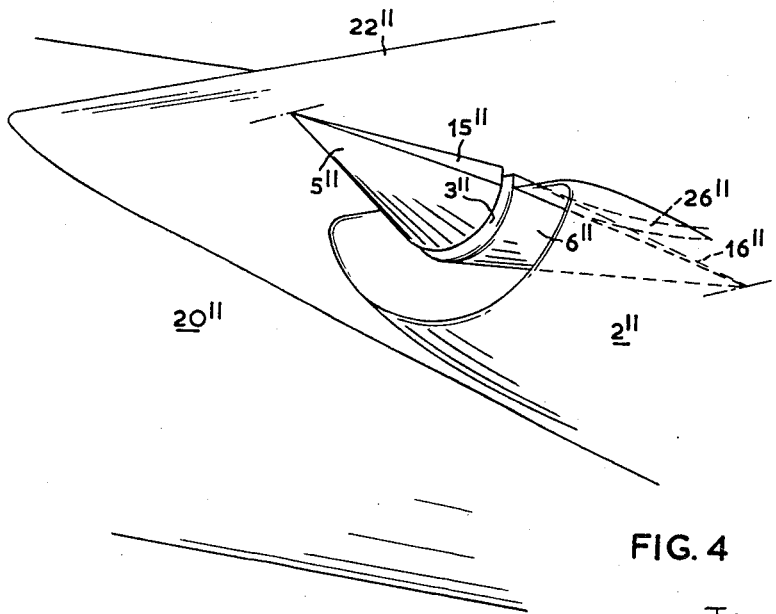
Figure 5:
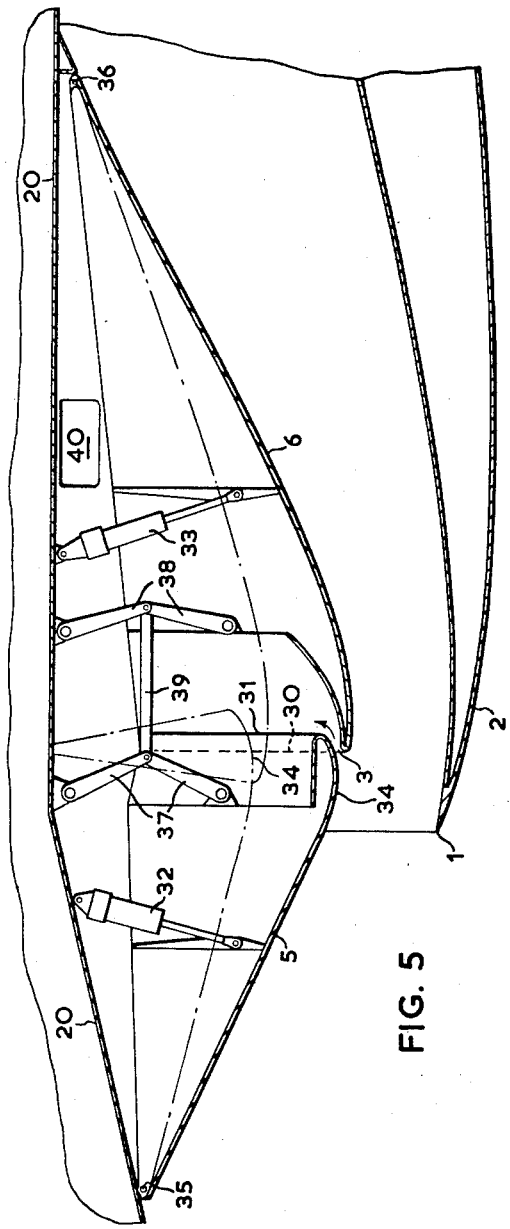
Figure 6:
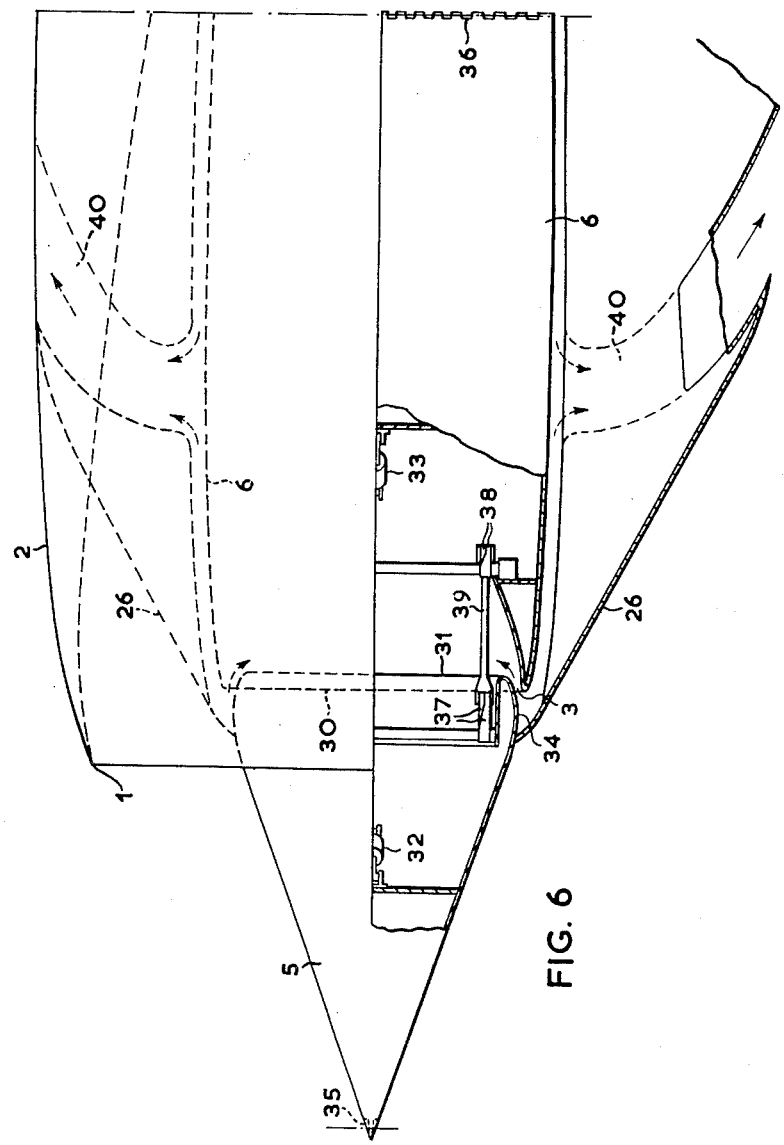

In order that the invention may be clearly understood, and readily carried into effect, an embodiment thereof will now be described with reference to the accompanying drawings, in which:

FIG. 1 is a diagrammatic perspective view of an air intake according to the invention arranged at the side face of an aircraft fuselage ahead of the leading edge of the aircraft wing, FIG. 2 is a diagrammatic end view of an air intake arranged on the side of a fuselage under the wing of a modified embodiment, FIG. 3 is a perspective diagrammatic view of a quarter-cone intake arranged in the corner between the side of a fuselage and the underside of a wing, FIG. 4 is a perspective diagrammatic view of a half-cone intake arranged on the underside of a wing, FIG. 5 is a horizontal section on the centre line of an arrangement corresponding to the diagrammatic FIGS. 1 and 2, and FIG. 6 is a vertical part section at right angles to FIG. 5.

Referring first to FIGS. 1 and 2, the side of the fuselage 20 and ahead of the leading edge of the wing 22 of a supersonic aircraft a cowl 2 having a lip 1 is mounted. A half-cone 5 and similar body 6, facing one another with their bases, are mounted retractably on the side of the fuselage 20, the half-cone 5 pointing forward of, and the body 6 pointing rearward into the cowl 2. A gap 3 is left between two bases of the bodies 5 and 6. Both bodies are mounted at their apices about axes perpendicular to their axes. The two bodies 5 and 6 have straight triangular flanks 15 and 16, respectively, which retract into the fuselage 20 when the ramp bodies are lowered, without leaving a gap.

The apex angle of the triangular flanks is chosen to cover the range of angle variation necessary to match the intake over the flight range, so that undesirable gaps at the cone-fuselage junction are avoided.

Fairings 26 may be arranged between the side of the fuselage 20 and the cowl 2, which overlap the gap 3 and taper off rearward and outward of the cowl. The semi-circular edge 1 of the cowl 2 is extended at 1" along two opposite radii parallel to and spaced from the side of the fuselage, the fairings 26 forming ramps for the outside air flowing between the side of the fuselage 20 and the radial portions of the cowl 2, the purpose of which will be explained later.

Referring now to FIG. 3, a cowl 2' is arranged in the corner between the underside of the wing 22' and the side of the fuselage 20'. The lip 1' of this cowl has the shape of a quarter circle with two radial portions substantially at right angles to one another ending short of the adjacent faces of the underside of the wing and side of the fuselage, respectively, fairings or ramps 26' connecting the said cowl with the said wing and fuselage respectively. Quarter-cone bodies 5' and 6', facing one another at their bases with a gap 3' between them are arranged in said corner similar to the half-cones of FIGS. 1 and 2. The bodies 5' and 6' have straight flanks 15', 16' respectively which retract into the aircraft structure when the cones 5', 6' are swung inwardly about their pivot axis indicated in chain dotted lines at their apices.

Referring now to FIG. 4, on the underside of a wing 22" a semi-circular cowl 2" is arranged having two opposite radial edges parallel to and spaced from the said underside and connected to it by fairings 26". Half-cones 5", 6" facing one another at their bases with a gap 3" between them and having straight flanks 15", 16" retractable into the wing 22" are arranged similarly to the half-cones of the embodiment of FIGS. 1, 2.

While FIGS. 1 to 4 are purely diagrammatical, FIGS. 5 and 6 show in more detail an embodiment corresponding to FIGS. 1 and 2. The cowl 2 having a sharp leading edge 1 is fixedly attached to the side of the fuselage 20. A forward half-cone 5 is hinged at its apex about a vertical pivot axle 35. A rear body 6 is not strictly speaking conical in that it has a semi-circular leading edge 30 but tapers off rearwardly not to a point but to a vertical line where it is hinged to the fuselage about a so-called piano hinge or book hinge 36. For brevity's sake and because its function is the same as that of a truly conical body, the body 6 will however be referred to hereinafter as "the rear cone." A gap 3 is left between the bases of the two bodies 5 and 6, where the leading edge 30 of the rear cone 6 somewhat overlaps the trailing edge 31 of the front cone 5. The front cone 5 is articulated to the fuselage 20 by means of a hydraulic jack 32 which allows to raise and lower the cone 5 about its pivot axle 35, and likewise the rear cone 6 is articulated to the fuselage 20 by a jack 33. A linkage of two pairs of toggle levers 37, 38 and a connecting link 39 articulates the two cones 5, 6 to one another, and it will be seen that in the raised position shown in FIG. 5 in full lines of the cones 5, 6 the gap 3 between them is widest, and in the collapsed position shown in dotted lines is closed by the leading edge 30 of the rear cone 6 contacting the hump 34 adjacent the trailing edge of cone 5.

Air entering into the interior of the cones 5, 6 may be bled off to the outer airstream through a duct 40 provided in the fuselage 20.

Ramps 26 (FIG. 6) overlap the gap 3 slightly forward of the hump 34 of the cone 5 and taper off rearwardly and outwardly forming fairings between the radial portions of the cowl 2 and the side of the fuselage 20. The bleed ducts 40 are likewise indicated in FIG. 6. The ramps 26 end just upstream the outlet of these ducts 40, and the air guided by these ramps helps to suck off the boundary air from the bleed ducts 40.

The arrangement according to the invention has several advantages:

(a) It allows the use of curved surfaces on the variable part of the intake and also on the main intake surfaces and on the subsequent duct surfaces. This is of considerable structural advantage since such curved surfaces, which are subject to high pressures, will withstand them more strongly than corresponding two-dimensional linear duct and ramp arrangements, with a consequent saving in weight.

(b) It avoids the poor internal duct lines which result, if matching is obtained, by translating the compression surface fore and aft.

(c) In general, if a two-dimensional variable ramp inlet is used to match the engine mass flow, ramp angles higher than the shock detachment values may be required for Mach numbers less than about 1.6, so that a two shock system then becomes impossible and is replaced by a curved shock. This can lead to difficulty if a shock sensing control system is being used, since this usually relies on the existence at the inlet of a normal shock of reasonable strength to provide a good pressure signal. For a three-dimensional inlet this problem is not so acute. It is possible in this case to maintain a two shock system down to Mach numbers of less than 1.3.

The gap 3, 3', respectively, between the bases of the half-cones 5 and 6 or quarter-cones 5' and 6', may be used for bleeding off the boundary layer air.

What we claim as our invention and desire to secure by Letters Patent, is:

1. An air intake for the air-consuming propulsion engine of a supersonic aircraft, comprising in combination: an aircraft structure having an outside wall, a cowl of substantially part-circular cross section attached to said outside wall having an intake opening facing forward, and connected to the entry of said air-consuming engine rearward, two tapered ramp bodies mounted, partly retractable, co-axially with one another and with said cowl at said intake with their bases facing one another, one of said bodies pointing forward upstream of said intake opening, the other one pointing back into said cowl, said tapered ramp bodies having straight flanks perpendicular to said outside wall and retractable into the same, the said flanks in the non-retractable position of said tapered ramp bodies presenting a triangular shape, the apex angle of which is determined by the range of angular ramp body movements to match the intake conditions at various flight velocities.

2. An air intake for the air-consuming propulsion engine of a supersonic aircraft, comprising in combination: an aircraft structure having an outside wall, a cowl of substantially part-circular cross section attached to said outside wall having an intake opening facing forward, and connected to the entry of said air-consuming engine rearward, two tapered ramp bodies mounted, partly retractable, co-axially with one another and with said cowl at said intake with their bases facing one another, one of said bodies pointing forward upstream of said intake opening, the other one pointing back into said cowl, a gap being provided between the said bases, bleeding-off means for the boundary layer communicating with the said gap, said tapered ramp bodies having straight flanks perpendicular to said outside wall and retractable into the same, the said flanks in the non-retracted position of said tapered ramp bodies presenting a triangular shape, the apex of which is determined by the range of angular ramp body movements to match the intake conditions at various flight velocities.

3. An air intake for the air-consuming propulsion engine of a supersonic aircraft, comprising in combination: an aircraft structure having an outside wall, a cowl of substantially part-circular cross section attached to said outside wall having an intake opening facing forward, and connected to the entry of said air-consuming engine rearward, two tapered ramp bodies mounted, partly retractable, co-axially with one another and with said cowl at said intake with their bases facing one another, one of said bodies pointing forward upstream of said intake opening, the other one pointing back into said cowl, the leading edge of the rear ramp body overlapping the trailing edge of the front ramp body in the non-retracted position and contacting said front ramp body just fore of the trailing edge of the latter in the part-retracted position of said ramp bodies, said tapered ramp bodies having straight flanks perpendicular to said outside wall and retractable into the same, the said flanks in the non-retracted position of said tapered ramp bodies presenting a triangular shape, the apex angle of which is determined by the range of angular ramp body movements to match the intake conditions at various flight velocities.

4. An air intake for the air-consuming propulsion engine of a supersonic aircraft, comprising in combination: an aircraft structure having an outside wall, a cowl of substantially semi-circular cross section attached to said outside wall having an intake opening facing forward, and connected to the entry of said air-consuming engine rearward, two half-conical ramp bodies mounted, partly retractable, co-axially with one another and with said cowl at said intake with their bases facing one another, one of said bodies pointing forward upstream of said intake openng, the other one pointing back into said cowl, said tapered ramp bodies having straight flanks perpendicular to said outside wall and retractable into the same, the said flanks in the non-retracted position of said tapered ramp bodies presenting a triangular shape, the apex angle of which is determined by the range of angular ramp body movements to match the intake conditions at various flight velocities.

5. An air intake for the air-consuming propulsion engine of a supersonic aircraft, comprising in combination: a wing, a cowl of substantially semi-circular cross section attached to the underside of said wing having an intake opening facing forward and connected to the entry of said air-consuming engine rearward, two substantially half-conical ramp bodies mounted, partly retractable, co-axially with one another and with said cowl at said intake, with their bases facing one another, one of said bodies pointing forward upstream of said intake opening, the other one pointing back into said cowl, said tapered ramp bodes having straight flanks perpendicular to said underside of the wing and retractable into the same, the said flanks in the non-retracted position of said tapered ramp bodies presenting a triangular shape, the apex angle of which is determined by the range of angular ramp body movements to match the intake conditions at various flight velocities.

6. An air intake for the air-consuming propulsion engine of a supersonic aircraft, comprising in combination: a fuselage, a wing attached to said fuselage, a cowl of substantially quarter-circular cross section attached in the corner between said fuselage and said wing having an intake opening facing forward, and connected to the entry of said air-consuming engine rearward, two substantially quarter-conical ramp bodies mounted, partly retractable, co-axially with one another and with said cowl at said intake, with their bases facing one another, one of said bodies pointing forward upstream of said intake opening, the other one pointing back into said cowl, said tapered ramp bodies having straight flanks perpendicular to said fuselage and wing, respectively, and retractable into the same, said flanks in the non-retracted position of said tapered ramp bodies presenting a triangular shape, the apex angle of which is determined by the range of angular ramp body movements to match the intake conditions at various flight velocities.

7. An air intake for the air-consuming propulsion engine of a supersonic aircraft, comprising in combination: an aircraft structure having an outside wall, a cowl of substantially part-circular cross section attached to said outside wall having an intake opening facing forward, and connected to the entry of said air-consuming engine rearward, two tapered ramp bodies mounted, partly retractable, co-axially with one another and with said cowl at said intake with their bases facing one another, one of said bodies pointing forward upstream of said intake opening, the other one pointing back into said cowl, cowl portions continuing the said part circular cross section substantially radially parallel to and spaced from the said wall of said aircraft structure, fairings arranged between said radial cowl portions and wall tapering off outwardly and rearwardly with respect to said cowl, said tapered ramp bodies having straight flanks perpendicular to said outside wall and retractable into the same, the said flanks in the non-retracted position of said tapered ramp bodies presenting a triangular shape, the apex angle of which is determined by the range of angular ramp body movements to match the intake conditions at various flight velocities.

8. An air intake for the air-consuming propulsion engine of a supersonic aircraft, comprising in combination: an aircraft structure having an outside wall, a cowl of substantially part-circular cross section attached to said outside wall having an intake opening facing forward, and connected to the entry of said air-consuming engine rearward, two tapered ramp bodies mounted, partly retractable, co-axially with one another and with said cowl at said intake with their bases facing one another, one of said bodies pointing forward upstream of said intake opening, the other one pointing back into said cowl, cowl portions continuing the said part circular cross section substantially radially parallel to and spaced from the said wall of said aircraft structure, fairings arranged between said radial cowl portions and wall tapering off outwardly and rearwardly with respect to said cowl, said tapered ramp bodies having straight flanks perpendicular to said outside wall and retractable into the same, the said flanks in the non-retracted position of said tapered ramp bodies presenting a triangular shape, the apex angle of which is determined by the range of angular ramp body movements to match the intake conditions at various flight velocities, a gap being provided between the bases of said two ramp bodies, bleed-off ducts arranged in said aircraft structure connecting the interior of said ramp bodies with the outside atmosphere at points just aft of the rear ends of the said fairings, the air flowing along said fairings between the said cowl and the said wall sucking off the air from said bleed-off ducts.

9. An air intake for the air-consuming propulsion engine of a supersonic aircraft, comprising in combination: an aircraft structure having an outside wall, a cowl of curved cross section attached to said outside wall having an intake opening facing forward, and connected to the entry of said air-consuming engine rearward, two tapered ramp bodies of curved cross section mounted, partly retractable, co-axially with one another and with said cowl at said intake with their bases facing one another, one of said bodies pointing forward upstream of said intake opening, the other one pointing back into said cowl, said tapered ramp bodies having straight flanks perpendicular to said outside wall and retractable into the same, the said flanks in the non-retractable position of said tapered ramp bodies presenting a triangular shape, the apex angle of which is determined by the range of angular ramp body movements to match the intake conditions at various flight velocities.

References Cited in the file of this patent

UNITED STATES PATENTS

| | | |
|---|---|---|
| 2,876,621 | Bogert et al. | Mar. 10, 1959 |
| 2,950,594 | Mitrovich et al. | Aug. 30, 1960 |

FOREIGN PATENTS

| | | |
|---|---|---|
| 709,300 | Great Britain | May 19, 1954 |

OTHER REFERENCES

SAE Journal, August 1958, vol. 66, No. 8, page 32. 60–35.6L.